March 13, 1934.  U. KÖLM  1,950,496
TABULATING MACHINE
Filed Oct. 3, 1930
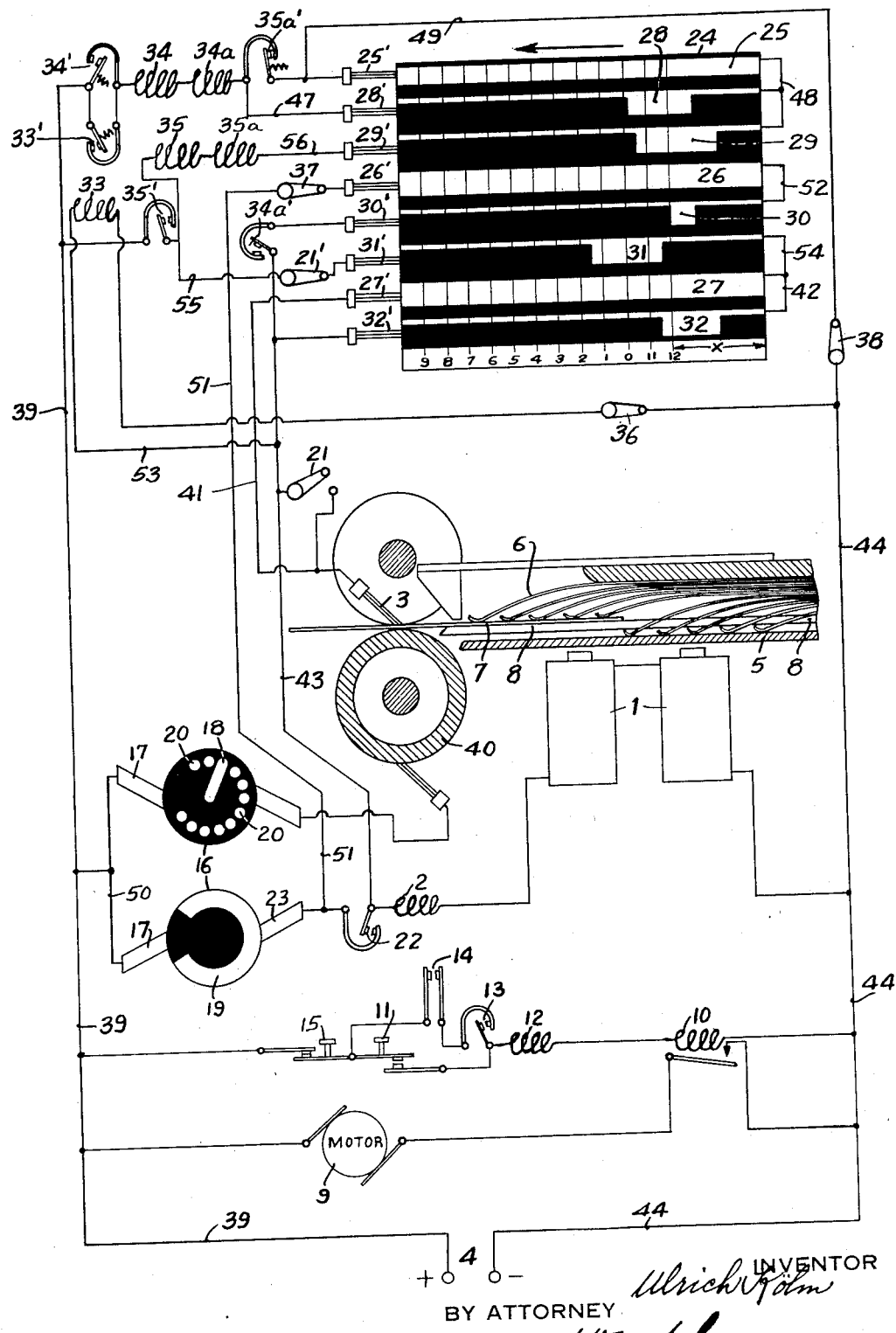

Patented Mar. 13, 1934

1,950,496

UNITED STATES PATENT OFFICE 1,950,496

TABULATING MACHINE

Ulrich Kölm, Berlin, Germany, assignor, by mesne assignments, to International Business Machines Corporation, New York, N. Y., a corporation of New York Application October 3, 1930, Serial No. 486,084
In Germany February 17, 1930

5 Claims. (Cl. 209—110)

The present invention relates broadly to card controlled machines in general and more particularly to those adapted to sort record cards such as those used to control the operation of the well known Hollerith type of tabulating machine.

The primary object of the invention is to provide a novel means which is capable of controlling a record card controlled machine whereby whole groups of cards representing completed series of transactions or operations may be selected as a group and conveyed to a given sorting pocket or station while incomplete groups of cards or single cards are conveyed to a different sorting pocket.

The foregoing may be better explained by an illustrative example taken from accounting practice in connection with installment buying. When an invoice of goods or an article is purchased and is to be paid for by a series of payments extending over a period of several months a card is perforated with data representing the amount of sale, customer's account number, or any other desired data which it may be desired to record together with a special perforation indicating that said card is a card opening an account. As each payment is made a card is likewise perforated with the amount thereof, the customer's account number, and so on. When the final payment is made a closing card is perforated with a special perforation signifying that the account has been closed.

It may be desired to periodically secure a statement which shows the status of all unpaid accounts and the total amount of unpaid accounts, that is to say, the balance due from accounts receivable, therefore, the problem presented, in order to secure the foregoing information, is to segregate the cards representing completed or closed accounts from those cards which represent accounts not fully paid up.

The present invention has for its main object to provide a simple and efficient means for accomplishing the foregoing results and contemplates controlling the sorting machine by means of the special perforation in the closing card of the group.

It will be understood hereinafter that debit cards opening an account will have a special perforation in the 11th index position, the subsequent credit cards representing payments on account being unperforated, except for the last credit card which will have a special perforation in the 12th index position, these special perforations being preferably made in the same column of successive cards, said column being hereinafter termed the control column.

The invention consists in principle of a switching mechanism, the switch elements of which control the card guiding and receiving organs, in such a way that completed card groups are guided to a predetermined sorting pocket, while the other cards are guided into another pocket. This switching device may comprise an electrical commutator adapted to be attached to an electrically controlled sorting machine of the general type shown in Letters Patent No. 1,741,985.

In the present invention the circuits of the commutator are connected with the circuits of the sorting machine in such a way that the sorting magnet of the machine is controlled in the desired manner. The disabling of the commutator to permit regular sorting operations may be effected in a known way by means of manual switches which are turned on prior to the beginning of the special sorting operation. When said switches are turned off and another switch turned on the sorter may be operated in the ordinary manner.

In the single figure of the drawing there is shown a preferred form of embodiment of the invention, that is, a commutator, in connection with an electrically controlled sorting machine, of which, for sake of simplicity and clearness, only the wiring diagram, the card analyzing position, and the arrangement of the control switches are represented.

Before proceeding with the description of the invention the sorting machine will be briefly explained as to its general principles. The single figure shows an electrically controlled sorting machine in which the sorting of the record cards is accomplished through the medium of a sorting magnet 1 under the control of a brush relay 2, which, jointly with the sorting magnet, is in circuit with the analyzing brush 3 and with the sorting magnet receives exciting current from source 4 as soon as a hole is encountered in the card column analyzed. According to the point of time at which the energization of the sorting magnet 1 takes place, the armature 5, upon which the ends of the tongues 6 of the guide bars leading to the card receiving pockets rest, determines the destination of the card being analyzed.

The ends of the tongues 6 are spring-urged downwardly with the armature 5 so that during the card analyzing cycle the record card 7 is guided between the ends of the tongues 6 and the armature 5, with the result that on the energization of the sorting magnet 1 only as many tongues 6 are lowered by the armature as do not overlie the record card, while the remaining tongues 6 are kept in raised position by said card. For this purpose there is provided a fixed bar 8, parallel to and on a level with the armature 5 in its normal position, arranged to support the record card after the armature is lowered. It need not be mentioned that time of energization of the sorting magnet depends upon the position of the hole in the card column, each of which has twelve index positions, so that the cards may be guided selectively into any one of twelve sorting pockets. Through the downward movement effected by energization of the sorting magnet, the tongues 6 disengaged from the card 7 produce a gap between the last tongue caught by the record card and the next adjacent tongue moved downwardly along with the armature 5 into which gap the record card is conveyed and thereafter guided to the coordinated sorting pocket by means of the usual card feeding rollers.

If it should happen that there is no perforation present in the card column analyzed the magnet 1 will not be energized and armature 5 will remain stationary with the result that the card will pass beneath all of the tongues 6 and will be guided to a thirteenth pocket known as the "reject" pocket. The card feeding mechanism may be substantially the same as that shown in Patent No. 1,741,985, if desired.

The drive of the machine is effected by means of a motor 9 which is under the control of a motor relay 10 in such a way that on the energization of the same it is connected to the current source 4. The energization of the relay 10 is effected through depression of the start key 11, which, simultaneously therewith, effects the energization of a card contact relay 12 connected in series with the relay 10 controlled by the passage of the cards through the machine and energized only as long as cards are passing beneath the brush 3. The relay 12 is energized by a depression of the key 11 and closes contacts 13 in series with the card lever contacts 14 and in shunt relation to the start key 11 so that as long as cards are run through the machine the energization of the relays 10 and 12 is maintained, thereby permitting release of the start key 11. After the last card has passed the brushes and the card lever contacts 14 have opened, or the stop key 15 has been depressed, the deenergization of the relays 10 and 12 is effected, in consequence of which the motor 9 will be disconnected from the current source 4 and the machine will thereafter come to rest.

In order to secure proper operation of the sorting machine, it is necessary that the sorting magnet remain energized from the moment at which energization takes place until the last index position in the card column has passed from beneath the analyzing brush 3 which would not be the case if the analyzing brush 3 alone controlled the energization of the sorting magnet.

The winding of the brush relay 2 is connected in series with the sorting magnet 1 and is energized therewith as soon as a hole is encountered in the card column analyzed and corresponding to the predetermined adjustment of the contact points of commutator 16. This commutator has a common wiping brush 17 connected to the current source 4 and rests upon a metal ring, not shown, which has a current conducting connection to a revolving contact arm 18 and also to a likewise revolving contact segment 19. The contact arm 18, which is synchronized with the speed of passage of the cards, wipes over twelve contact points 20, the number of which corresponds with the number of index point positions in the card column. The contact point positions 20 may be rendered current conducting at will with the metal ring wiped by the brush 17, so that for the purpose of card sorting the commutator may be set up to select cards having perforations only in predetermined index point positions.

If, during the passage of the card past the brush 3, the card hole in the column analyzed coincides with a contact point position 20 of the commutator 16 which has been previously made current conducting, then, as may be seen from the drawing, energization of the brush relay 2 and the sorting magnet 1 will be effected. This will only happen provided the switch 21, located in the circuit to the relay 2 and the magnet 1, is closed, the purpose of which will be specified later on. The sorting magnet 1 therewith effects the above mentioned control of the guide bar tongues 6, while the relay 2 closes contacts 22 and is thereby connected to the contact segment 19 of the commutator 16 to complete a holding circuit for itself and the sorting magnet 1 so that the relay 2 and the magnet 1 remain energized as long as the segment 19 is in contact with the wiping brush 23. When the segment 19 passes beyond the brush 23, the relay 2 and the sorting magnet 1 become deenergized so that when the next card comes under brush 3 a new cycle may begin.

In order to render the sorting machine effective so that not only single cards may be selected from a batch with regard to their group designation but also whole groups of related cards as well, commutator 24 is provided and is shown schematically in the drawing. The speed of revolution of this commutator is the same as that of the commutator 16 and it is driven likewise by the motor 9. The commutator 24 is provided with three contact rings 25, 26, 27 having corresponding wiping brushes 25', 26', 27', respectively, and with contact segments 28, 29, 30, 31, 32, having the wiping brushes 28', 29', 30', 31', 32', respectively. The surface of the commutator is divided, according to the number of index point positions in a column of the record cards, into twelve equally spaced positions by means of parallel lines indicated consecutively with the numbers 9, 8, 7, 6, 5, 4, 3, 2, 1, 0, 11, 12, and in addition has an undivided section X, corresponding to the space or gap between two successive record cards with reference to their last and first index point positions, respectively. The commutator 24 is provided to effect the energization of the sorting magnet 1 at the right instant and to maintain such energization for a certain period. For this purpose there is provided a group of relays which are controlled by the commutator 24 and conjointly influence the sorting magnet 1, consequently they determine the ultimate destination of the cards.

The relay 33 is connected in parallel with the brush relay 2 and the sorting magnet 1 and is provided with contacts 33', which on closing connect two relays 34 and 34a in series with the wiping brush 28' of the commutator 24. The relay 34 has contacts 34', which, when closed on energization of the relay 34 by closure of contacts 33' of relay 33, establishes a holding circuit for the relays 34 and 34a. The relay 34a has contacts 34a' which are adapted to connect the relay 33 with the commutator brush 30'. Two relays 35 and 35a are likewise connected in series with the commutator brushes 29' and 31', by means of which the contacts 35' and 35a' are controlled. The already mentioned switch 21 as well as the switches 21', 36, 37 and 38 serve to control the setup of the whole device according to the purpose for which the sorting machine is to be used.

When ordinary sorting operations are to be performed, the switch 21 is closed and switches 21', 36, 37 and 38 are opened. During special or group selecting operations, the switch 21 is open and switches 21', 36, 37 and 38 are closed.

The operation of the foregoing devices will now be described in order to illustrate how special sorting operations are carried out. It will be assumed that the card batch has been previously sorted by an ordinary operation of the sorting machine and that the cards have been arranged in groups according to the respective account numbers, of which each group contains either one first bookkeeping card alone or such a card and non-balancing credit cards, or, besides the above mentioned cards, a further balancing bookkeeping card. Of the various card groups possible, the latter type represents a complete series of transactions so far as bookkeeping is concerned and may be removed from the card batch. It will be assumed further that the balancing bookkeeping cards or credit cards are provided with a perforation at the 12th index point position of the control column and that the first bookkeeping cards or debit cards are provided with a perforation at the 11th index point position of the same column, while the non-balancing credit cards have no special perforation. A convenient way of arranging the cards is to sort them in inverse chronological order according to the dates on which the respective transactions took place. The preliminary normal sorting operation will thus be carried out so that the balancing bookkeeping cards, that is, those with a perforation at 12 in the control column, naturally always appear as the first card of the groups in which they happen to be present, while those cards with a perforation at "11" will naturally appear last in the group. Thereafter the following cycles will occur after the contact points 20 of the commutator 16 corresponding to the 11th and 12th positions are set in the well-known manner and the start key 11 of the sorting machine has been depressed to begin the feeding of cards past the brushes 3.

Since the commutators 16 and 24 are driven synchronously with the card, it will be obvious that a current flow may be completed through a card hole in the 12th position of the commutator in the following manner: from source 4, line 39, commutator brush 17, contact arm 18, contact point 20 in the 12th position of commutator 16, contact roll 40, brush 3, line 41, brush 27' of commutator 24, contact ring 27, line 42, segment 32, brush 32', line 43, relay 2, magnet 1, and line 44, back to source 4. The sorting magnet 1 and relays 2 and 33 become energized and the card under brush 3 will be carried to the 12th pocket owing to the lowering of all but one of the tongues 6. The relay 2 closes contacts 22 while relay 33 closes contacts 33' so that the holding circuit for relay 2 is established through segment 19 and the circuit through relays 34, 34a, is set up thereby closing contacts 34a'. The circuit through relays 34, 34a will be maintained throughout succeeding card cycles until a card perforated in the 11th position passes the brush 3. At the 12th position of commutator 24 the holding circuit for relays 34, 34a is jointly established to line 44 through contacts 35a' (held closed by a spring) and through brush 28', segment 28, line 48, and ring 25 so that the holding circuit is maintained although segment 28 eventually passes out of contact with brush 28'.

The card perforated in the 12th position will be followed by one or more cards which are not perforated in the control column or by a card perforated in the 11th position. When such unperforated card passes the brush 3 no circuit flow can be established through the brush 3, hence it cannot control relay 2 and magnet 1 in the usual manner to divert the unperforated card to a card pocket. Nevertheless, since it is desired to divert this card and any other unperforated cards which immediately follow said card to the 12th pocket, it is necessary to operate the relay 2 and magnet 1.

This is accomplished by the brush 30' and segment 30 which make contact in the 12th position of the commutator 24 and establish the following circuit: from source 4, lines 39 and 50, brush 17, segment 19, brush 23, line 51, switch 37, brush 26', contact ring 26, line 52, segment 30, brush 30', contacts 34a', previously closed, line 43, relay 2, sorting magnet 1, and line 44, back to source 4, thereby diverting said card to the 12th pocket. The relay 2 closes contacts 22 and establishes its holding circuit in the usual manner through brush 23, segment 19 and brush 17, this holding circuit being eventually broken when the unperforated card passes from beneath the brush 3. All immediately following cards which are not perforated in the control column will be similarly diverted to the 12th pocket.

The presence of a perforation in the 12th position of a card signifies that said card and those immediately following it belong to a single group, the last card being perforated in the 11th position. The unperforated cards and the card perforated in the 12th position will be diverted to the 12th pocket as above described and it is also necessary to divert the card perforated in the 11th position to the 12th pocket since it completes the group. When such a card passes the brush 3 no circuit can be established by said brush through the relay 2 and magnet 1 since the brush 32' does not make contact with segment 32 until the commutator 24 reaches the 12th position. Nor can a circuit be established through the relay 2 and magnet 1 by means of the brush 30' and contact ring 30 in the 11th position of commutator 24, however, a circuit will be established from source 4, lines 39 and 50, brush 17, contacts 18, 20, contact roll 40, brush 3, line 41, brush 27', contact ring 27, line 54, segment 31, brush 31', switch 21', line 55, relays 35 and 35a, thereby closing contacts 35' and opening contacts 35a', line 56, brush 29', segment 29, line 48, contact ring 25, brush 25', lines 49 and 44, back to source 4.

The relay 35, in closing contacts 35', establishes a holding circuit for itself and relay 35a which is maintained to the end of the card cycle, thereby holding the contacts 35a' open without however, immediately disturbing the holding circuit for the relays 34, 34a. It will be observed that the segments 28 and 29 are so arranged that the brush 28' touches segment 28 slightly before brush 29' touches segment 29 so that the holding circuit through relays 34, 34a will be maintained although the relay contacts 35a' have been open. As a result the sorting magnet 1 and relay 2 will not be affected at the 11th position of the commutator 24 but they will be energized, as in the case of the preceding unperforated card, at the 12th position of the commutator 24 since contacts 34a' remain closed.

The whole result will be that the card perforated at the 11th position will be diverted to the 12th pocket in spite of the fact that it is not perforated in the latter position. It therefore follows that the first card of the completed group of cards and every card thereafter will be diverted to the 12th pocket.

It is now necessary to break the holding circuit through the relays 34, 34a in order to prepare the system for analyzing the next card following the card perforated in the 11th position. This is accomplished by making the segment 29 slightly longer than the segment 28 so that the brush 28' leaves the segment 28 before the segment 29 passes from beneath brush 29' to break the holding circuit through relays 35 and 35a. This means that the contacts 35a' remain open for a short time after the circuit through relays 34 and 34a has been broken thereby permitting contacts 34' and 34a' to open. The segment 29 should be made long enough to hold the contacts 35a' open until after segment 19 has been removed from contact with brush 23, otherwise the energization of relays 2 and 33 by the segment 30 would reestablish the holding circuit through relays 34 and 34a thereby rendering the relays 35, 35a and segment 29 useless and of no effect.

The foregoing explains the operation of the machine in selecting a card group which is complete, that is, a card group having a card perforated at "12", a card perforated at "11" and, possibly, unperforated cards in between, all having a conforming series of perforations representing the account number or some similar identifying number peculiar to that group. This group may be followed by a similar group, which will be diverted in exactly the same manner to the 12th pocket, or by a group comprising one or more unperforated cards and a card perforated at "11", the latter being an incomplete group.

When the unperforated card passes beneath the analyzing brush 3 the magnet 1 and relays 2 and 33 cannot be energized, owing to the lack of a perforation in the column analyzed, nor can the segments 29, 30 or 31 establish circuits to affect the sorting magnet since the relay contacts 34a' have already been opened by the passage of the card perforated at "11" which completed the previously analyzed completed group. As a consequence any unperforated card, not preceded by a card perforated at "12", will be diverted to the "reject" pocket.

Such an unperforated card or series of cards will be followed by a card perforated at "11". When this card is analyzed by the brush 3 no circuit can be established through the relays 2 and 33 and sorting magnet 1 since the segment 32 does not contact with brush 32' at the "11" position of the commutator 24, therefore, the contacts 34a' will remain open and prevent the establishment of a circuit through segment 30 when the "12" position is reached. A circuit will be established at the "11" position of commutator 24 through brush 3, contact ring 27, line 54, segment 31, brush 31' and relays 35 and 35a thereby opening contacts 35a' but this circuit is harmless and ineffective. It will be clear therefore, that said card will also be conveyed to the "reject" pocket. Exactly the same action will take place when a card perforated at "11" follows a similar card perforated "11" regardless of the fact that the latter card may be the last card of a completed group.

It will be seen from the foregoing that a completed card group consisting of a card perforated at "12", a card perforated at "11", and one or more unperforated cards will be conveyed to the "12" pocket while uncompleted card groups or single cards perforated at "11" will be conveyed to the "reject" pocket.

The cards accumulated in the "12" pocket, representing completed card groups, may be removed and used to prepare statements of say accounts closed or paid up, while the cards accumulated in the "reject" pocket may be removed and utilized to prepare statements of account or statements of accounts receivable. It will thus be seen that the present invention is capable of a variety of uses, therefore, it is not desired to limit its scope to the illustrative examples shown and described.

Although the present invention has been shown as applied to a sorting machine it is not desired to limit its scope thereto as it is capable of attachment to a tabulating machine as well and when so attached may be utilized to determine which class of cards is to be tabulated, that is, whether completed groups or uncompleted groups are to be fed to said tabulating machine. Thus, when it is desired to tabulate completed groups the uncompleted groups will not be fed to said tabulating machine while, if it is desired to tabulate the incomplete groups, the completed groups will not be fed to said machine.

I claim:

1. A machine of the class described having means for analyzing successive controlling records arranged in groups, sorting mechanism including a sorting circuit, means controlled by said analyzing means for setting up said sorting circuit according to a special designation occurring in one of said groups to remain effective for succeeding cards of the group, and means controlled by a different special designation occurring in the same group for rendering ineffective the circuit set up to prepare said circuit for the analysis of a succeeding group.

2. A group selecting device comprising means for successively analyzing cards arranged in groups some of which are complete, sorting mechanism including a sorting circuit, means controlled by said analyzing means for setting up said circuit according to a special designation occurring in the first card of a complete group and means controlled by a different designation in the last card of said group for disabling the circuit set up.

3. A group selecting device comprising means for successively analyzing record cards arranged in groups, means controlled thereby and effective upon the occurrence of a special designation in the first card of a group to determine the disposition of said group as a whole, and means controlled by said analyzing means and rendered effective by a different special designation in the last card of said group for disabling said seconds named means after the latter has determined the disposition of the last card of the group.

4. A group selecting device for selecting completed groups from a batch of record cards which may also include incomplete groups comprising means controlled by one of the cards present in a completed group for determining the destination of the group as a whole, and means controlled by another card of said group for disabling said first named means after said first named means has become effective to determine the destination of said second named card.

5. A group selecting device for selecting completed groups from a batch of record cards which may include incomplete groups comprising means normally effective to reject all of said cards, and means controlled by a special designation occurring in one of the cards of a complete group for rendering ineffective said first named means and controllable by a different special designation in another card of said group to restore the effectiveness of said first named means.

ULRICH KÖLM.